2 Sheets--Sheet 1.

J. A. WOODBURY.

Improvement in Car Wheels.

No. 4,761. Reissued Feb. 13, 1872.

Witnesses. { Charles E. Foster
A. H. Norris

Jas. A. Woodbury
By his Attys
Howson & Sons

AM. PHOTO-LITHOGRAPHIC CO. N.Y. (OSBORNE'S PROCESS.)

J. A. WOODBURY. 2 Sheets--Sheet 2.

Improvement in Car Wheels.

No. 4,761. Reissued Feb. 13, 1872.

Witnesses { Charles Foster
A. F. L. Notter

Jno. A. Woodbury
By Wm. Edson
Howson & Son

AM. PHOTO-LITHOGRAPHIC CO. N.Y. (OSBORNE'S PROCESS.)

UNITED STATES PATENT OFFICE.

SOLOMON P. SMITH, OF TROY, NEW YORK, ASSIGNOR, BY MESNE ASSIGNMENTS, TO JAMES A. WOODBURY, OF BOSTON, MASSACHUSETTS.

IMPROVEMENT IN CAR-WHEELS.

Specification forming part of Letters Patent No. 28,512, dated May 29, 1860; reissue No. 4,761, dated February 13, 1872.

DIVISION B.

Specification describing certain Improvements in Car-Wheels, invented by SOLOMON P. SMITH, of Troy, county of Rensselaer, State of New York.

This invention relates to elastic car-wheels, in which the center or body is in two sections, each having a bearing for the reception of a portion of a divided elastic medium which isolates the tire; and the invention consists in certain improvements too fully described hereafter to need preliminary explanation, whereby the thorough compression of the elastic medium, and its retention at the pressure imparted to it is insured, and whereby the rim is securely connected to the body.

Figure 1:
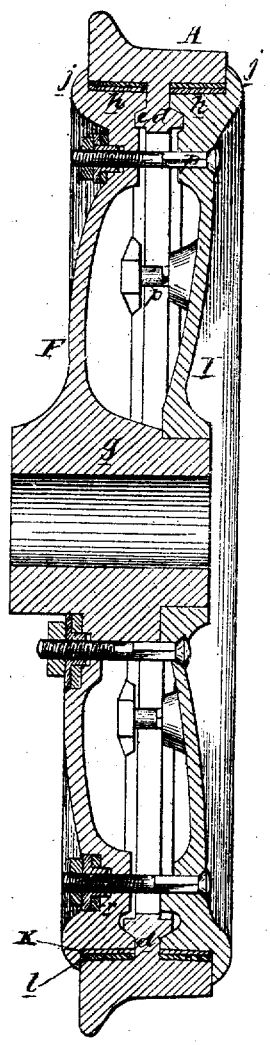
Figure 5:
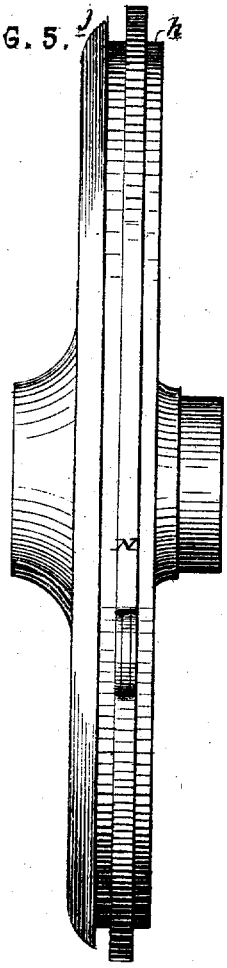
Figure 4:
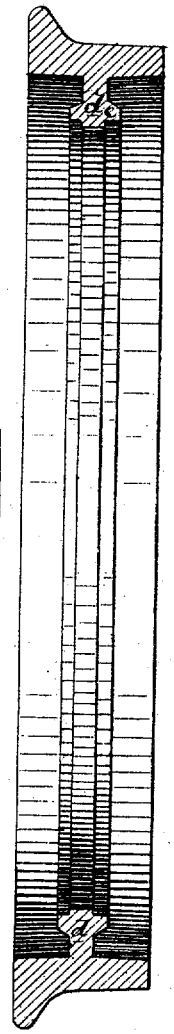
Figure 2:
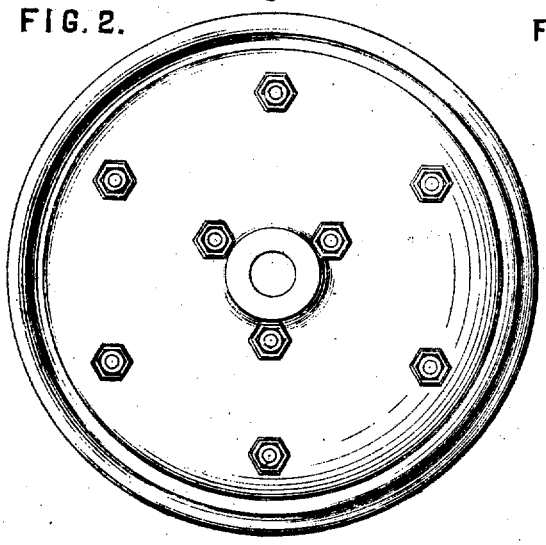
Figure 3:
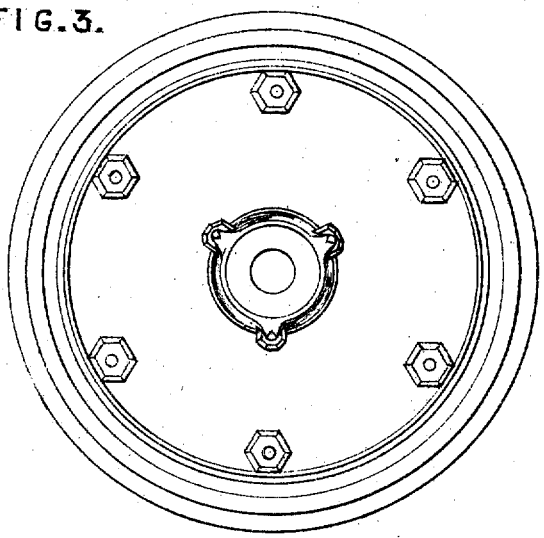
Figure 7:
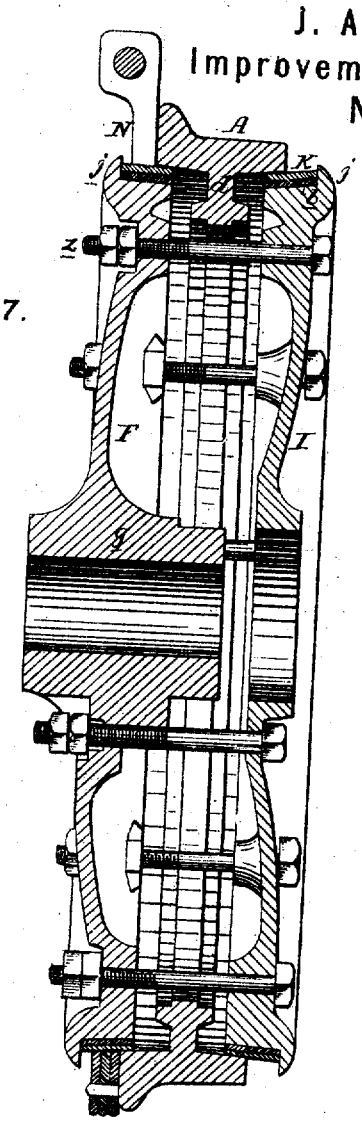
Figure 8:
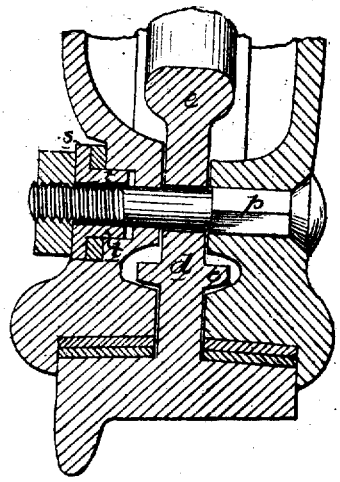
Figure 9:
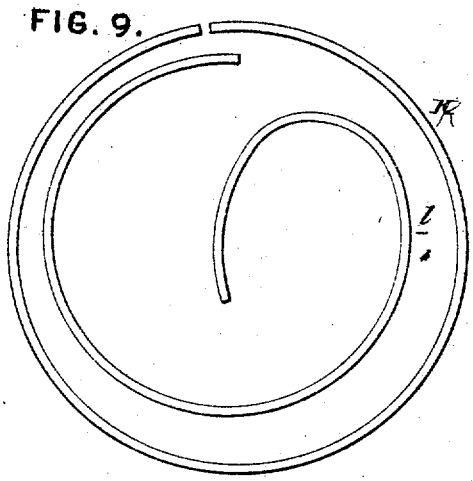
Figure 6:
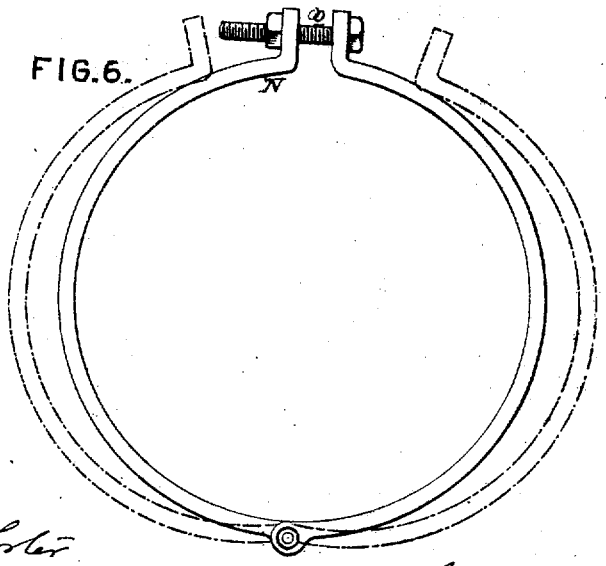

In the accompanying drawing, Figure 1, Sheet 1, is a transverse section of an elastic car-wheel with the improvements; Fig. 2, a front view of the wheel; Fig. 3 a rear view; Fig. 4, a sectional view of the tire or rim; Fig. 5, a detached view of parts of the wheel; Fig. 6, Sheet 2, a device for compressing the elastic packing; Fig. 7, a view illustrating the mode of using the said compressing device and of putting together the parts of the wheel; Fig. 8, a sectional view showing a modification; and Fig. 9 a detached view of part of the wheel.

The central portion or body of the wheel consists of a disk, F, having a thickened periphery and a hub, *g*, for the reception of the axle, and a disk, I, the latter either fitting upon an annular projection on the disk F, or having a hub fitted directly to the axle. The rim or tire A has, at the inner side, a central annular rib, *d*, which extends between the plates or sections F I, each of which is recessed to receive an annular projection, *e*, on the rib. At the outer edge of each section F I is an annular flange or shoulder, *j*, and the face or periphery *h*, adjacent to the said shoulder, is conical, coinciding with the conical inner faces of of the rim A at each side of the rib *d*, as shown in the drawing. The rim A may be of cast-iron with a chilled tread, or of wrought-iron, or of malleable cast-iron, or steel, and the sections or plates F I may be of any of the said materials, and may be dished, waved, or of any other suitable form. Between the inner faces of the rim and the faces *h h* of the disks is a packing, consisting of a band or strip, *l*, of compressed rubber or other elastic material, and an outer flexible metallic band, K. Before the parts of the wheel are put together, the elastic strips *l*, covered by the flexible bands, are placed upon the bearing faces of the disks with their outer edges bearing against the shoulders *j j*, and are forcibly compressed. On applying the rim to the sections the packing, owing to the inclination of the surfaces between which it is placed, is further compressed until it becomes so dense that it will not yield materially under the ordinary weight or pressure to which it is subjected when the wheel is in use. To effect the preliminary compression of the packing the clamps N, Fig. 6, may be employed. The clamp consists of a sectional jointed iron-ring about half as wide as the packing *l*, and provided with a tangential screw, *o*, by which the circumference may be contracted. The clamp is put around the packing on the disk, as shown in Figs. 5 and 7, and contracted until the packing is so compressed as to permit the rim to be applied to the disk, and overlap part of the packing when the clamp may be removed. The application of the rim is made to both disks simultaneously, the disks being brought together by means of temporary screw-bolts *z*, (Fig. 7,) or otherwise. The plate K prevents the abrasion or wrinkling of the rubber, as the disk is forced inward, and the shoulder *j* serves to retain the packing laterally in its position. When the parts of the wheel have been brought to the position shown in Fig. 1, they are secured together by transverse bolts *p p*, and the rib *d* may be increased in depth, so as to permit the outer series of bolts to extend through the same, as shown in Fig. 8. The rib *d* strengthens the rim, and by means of the bolts, (Fig. 8,) which are smaller than the hole in the rib *d*, will be securely retained in connection with the central portion of the wheel, even when broken transversely in one or more places. By powerfully compressing the elastic packing on the shoulders it is so condensed as to prevent any movement of the rim tending to impair the integrity of the packing, while the transmission of vibrations from the rim to the axle is effectually prevented, and such a firm support is afforded for the rim that it cannot be sprung inward and broken. A packing consisting of two pieces inserted on opposite sides of the rim is more easily compressed and applied than one composed of a continuous piece and introduced from one side of the wheel.

The flanges *j j* of the sections F I may project to, nearly to, or beyond the inner surface of the rim, as may be desired. In order that the nuts *u* of the fastening-bolts *p* may not become loosened by the jarring of the wheel, or by the expansion and contraction of the same under variation of temperature, the plate beneath each nut and surrounding the bolt is recessed for the reception of an elastic packing, *r*, upon which the washer *s*, (Fig. 8,) is forced by the turning of the nut.

A sleeve, *t*, which projects from the washer and surrounds the bolt, prevents the packing from being forced against the latter, and from being cut by or adhering to the threads. The packing under pressure tends to maintain the washer in forcible contact with the nut, and thereby prevents the latter from turning.

When keys are employed as a substitute for the nuts they may be retained in place by elastic packings and washers in a similar manner.

In place of India rubber felt or other elastic substance, which will absorb the vibrations, may be employed.

No claim is made to a continuous packing compressed between two beveled faces at the inner side of the rim, nor to a wheel having such a rim and a hub in two parts, each with a periphery coinciding with one of said faces, as such features are shown in the application of J. J. Sherman, filed in 1856; but

I claim—

1. A packing for elastic car-wheels consisting of two independent elastic rings compressed on two inclined faces of the rim of the wheel, as specified.

2. The combination of the sectional body, a tire having an internal rib intervening elastic packing material, and bolts *p*, which extend through both sections and through the rib, substantially as and for the purpose set forth.

In testimony whereof I have signed my name to this specification in the presence of two subscribing witnesses.

Witnesses: JAMES A. WOODBURY.
JAS. B. BELL,
C. C. GILBERT.